Dec. 17, 1968    J. T. CABBAGE    3,416,667
PRESSURE RELIEF SYSTEM
Filed Aug. 1, 1966

INVENTOR
J. T. CABBAGE
BY
ATTORNEYS

United States Patent Office 3,416,667
Patented Dec. 17, 1968

3,416,667
PRESSURE RELIEF SYSTEM
John T. Cabbage, Bartlesville, Okla., assignor to Phillips Petroleum Company, a corporation of Delaware
Filed Aug. 1, 1966, Ser. No. 569,519
3 Claims. (Cl. 210—104)

ABSTRACT OF THE DISCLOSURE

A pressure vessel and pressure relief apparatus permitting disposal of pressure and water without loss of a lighter valuable fluid product comprising in combination a closed vessel, interface control means, pressure relief conduit means, discharge outlet conduit, pressure valve, and a T or similar joint so positioned to permit a substantially continuous discharge of fluids to communicate with said valve to prevent the freezing of fluids in said relief system.

---

Figure 1:
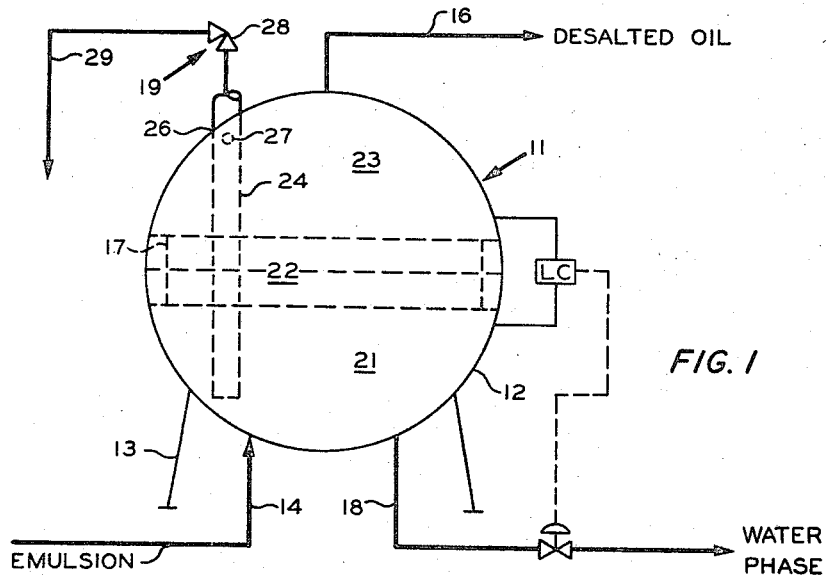

This invention relates to pressure relief. In one aspect it relates to method and apparatus for pressure relief from a multiphase system.

Pressure relief systems are widely used. A common practice is to place a relief valve set to open at a predetermined pressure on the upper shell of a vessel. When such a vessel contains more than one phase, relief discharge of the upper phase or phases may result in discharge of a fluid which is difficult to dispose of or which has appreciable value. For example, electrical desalting systems are often used in crude oil processes. The oil in such a vessel is hot and the relief valve on the upper portion of the vessel when the situation demands it must relieve into a large relief line which must be extended some distance to a disposal point. For normal operation of an electrical desalter unit about ⅓ of the volume of the vessel is occupied by water in the lower portion of the vessel. However, upon release of the excessive pressure in the vessel the oil is discharged through the relief valve and the relief line and the water remains in the vessel. Thus, the more valuable as well as the more difficultly disposed of fluid is discharged when the system reaches a pressure wherein relief is effected through the pressure relief valve.

An object of my invention is to provide pressure relief. Another object of my invention is to avoid disposing of a fluid which is difficult to disposed of. Another object is to avoid loss of valuable product fluid in pressure relief. Another object is to prevent freezing of a pressure relief system.

Other aspects, objects, and advantages of the invention will be apparent to one skilled in the art from a study of the written description, the drawings, and the claims.

According to my invention a pressure relief system having means to prevent freezing of fluid in said relief system is provided to remove a portion of one of the phases on an increase in pressure to a preselected pressure.

Further according to my invention a vessel in a crude oil electrical desalting system is provided with a relief system comprising a conduit extending through the wall of the vessel and in open communication with the aqueous phase of the vessel with a relief valve in the conduit placed outside the vessel.

Further according to my invention the aqueous phase process discharge conduit of a phase separator is arranged to discharge at least a portion of the aqueous medium in contact with the downstream side of the relief valve, thus providing a heat exchange between the relief valve and the discharge conduit to prevent the freezing of fluid in the relief valve.

Further according to my invention a relief system for an electrical desalting system is provided wherein the relief conduit extends through the oil phase in the desalting system and into the lower aqueous phase. An aperture is provided in the upper portion of the relief conduit, upstream of the relief valve, to allow oil to enter the conduit and provide an oil seal for the relief valve, thus preventing the freezing of fluid in the valve. Upon an increase in pressure above a preselected pressure in the vessel, only a small portion of oil present is removed with the expelled aqueous phase in order to reduce the pressure of the system as desired.

In the drawings FIGURE 1 is a schematic cross section of a crude oil electrical desalting system having relief means to remove a portion of the lower aqueous phase through an upper portion of the vessel.

Figure 2:
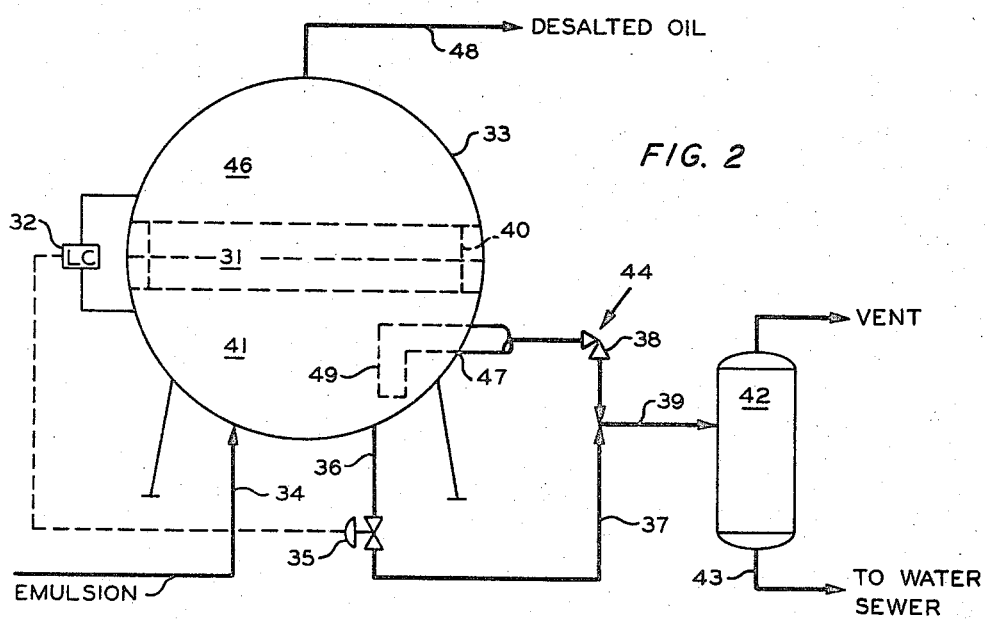

FIGURE 2 is a schematic cross section of a crude oil electrical desalting system having a relief means to remove a portion of the lower aqueous phase directly.

In FIGURE 1 the electrical desalter relief system, generally indicated by the reference numeral 11, comprises a closed vessel 12, supported on at least three legs 13, an aqueous emulsion inlet conduit 14, a desalted oil outlet conduit 16, connected to the upper portion of said vessel 12, an electrical emulsion breaking electrode means 17 (shown schematically) disposed within said vessel 12, a water or aqueous solution outlet 18 in the lower portion of vessel 12, a relief means generally indicated by the reference numeral 19 extending through a wall of said vessel and in communication with an aqueous phase 21 of vessel 12. Vessel 12 contains an aqueous phase 21 in the bottom portion of vessel 12, an interface 22 comprising an emulsion of oil and water, and a desalted oil phase 23 which is withdrawn from vessel 12 by means of line 16 and passed to storage or to processing, such as distillation.

The electrical desalter relief means generally indicated by numeral 19 comprises a relief conduit 24 extending through an opening 26 in vessel 12 and attached in pressure-tight arrangement to vessel 12 by means not shown. Conduit 24 extends into aqueous phase 21 of said vessel, and has an aperture 27 near opening 26 in vessel 12 and upstream of relief valve 28. Aperture 27 of conduit 24 allows oil 23 to seep in through aperture 27 into conduit 24 to maintain oil or an oil seal in contact with relief valve 28 to prevent freeze-up in cold weather. Upon an increase of pressure above a predetermined pressure in vessel 12, relief valve 28 which is in open communication with conduit 24 is opened, allowing the aqueous phase 21 in vessel 12 to pass up conduit 24, through relief valve 28, and into line 29 which communicates with relief valve 28 and a sewer or disposal means (not shown). When relief valve 28 is not in use, the downstream portion of the valve 28 is not directly heated; but since no water remains in contact therewith, and since oil is on the upstream side thereof, freezing of this relief valve does not now occur.

Relief conduits ranging from about 2 inches to about 20 inches in diameter can be used depending on the quantity of oil being processed in the crude oil electrical desalter system. The aperture in the conduit preferably ranges from ⅜ inch to ½ inch in diameter. Smaller-sized apertures are often undesirable because of their tendency to plug and thus prevent the formation of the oil seal. Apertures larger than ½ inch in diameter are often undesirable because they allow too much oil to be discharged through the aperture when the relief valve is opened. The shape of the aperture is not limited to a circular shape, but can be of any desired shape such as elliptical, rectangular, etc.

In the equipment of FIGURE 2 the relief system is not in contact with the oil phase. Heated oil-water emulsion enters vessel 33 by way of conduit 34 and contacts with electrical emulsion breaking electrode means 40 (shown schematically) disposed within vessel 33. Interface level 31 is controlled by liquid level control means 32 which regulates interface 31 within vessel 33 by controlling valve 35 which controls discharge of water from outlet 36 in vessel 33. When interface 31 is maintained at its desired position, liquid level control means 32 operates valve 35 so as to pass water substantially continuously through line 37 which is in heat exchange relation with relief valve 38 to keep the relief valve warm and thus prevent it from freezing in cold weather. Line 39 communicates with line 37 to take aqueous liquid phase 41 from either relief valve 38 or from vessel 33 to flare drip tank 42 wherein the water and any vaporous hydrocarbons are separated and the water is removed from flare drip tank 42 by line 43 to a sewer (not shown). Desalted oil phase 46 is withdrawn from vessel 33 by means of line 48 to storage or processing means. Relief means 44 comprises conduit 49 which passes through opening 47 in vessel 33 and is affixed to vessel 33 in pressure-tight arrangement by means not shown. Relief valve 38 communicates with line 37 communicating with line 39 to the flare drip tank. Hot water is continuously drawn from aqueous phase 41 and contacts the downstream side of relief valve 38 to this portion of the valve. Heat is furnished to the upstream side of relief valve 38 partially by conduction from vessel 33. This prevents freeze-up of relief valve 38 during "non-use" so that it is always in operable condition.

Although in the above description the relief conduit is shown extending vertically (in FIGURE 1) and horizontally (in FIGURE 2), such conduits can be positioned at various locations and extending at various angles to communicate with the desired phase of the vessel. It is also possible, in the embodiment illustrated in FIGURE 2, to completely eliminate any conduit which extends within the vessel so long as the opening to the release valve is positioned at a desired point. For example, in the embodiment in FIGURE 2, a point substantially below the emulsion inlet 34 normally would be selected.

It will be apparent to those skilled in the art that the illustrations are schematic and details of means for assembling and disassembling the equipment, and specific items of equipment necessary or desirable in the operation, including, for example, valves, pumps, control means, wiring and electrical source, etc., have been omitted, thus clarifying the illustration of the invention.

Reasonable variation and modification are possible within the scope of the invention which sets forth methods and apparatus for releasing the pressure of the vessel.

What is claimed is:

1. A pressure vessel and pressure relief apparatus permitting disposal of water without loss of a lighter valuable fluid product and having the means to prevent freezing of the pressure relief system comprising in combination:
   (a) a closed vessel suitable for containing at least two immiscible fluid phases, one of which can be aqueous and heavier than the other phase;
   (b) interface control means for maintaining a predetermined interface level, between said phases, in a central region of said vessel;
   (c) a pressure relief conduit means in communication with the volume in said vessel below said interface level;
   (d) a discharge outlet conduit communicating with said vessel below said interface level;
   (e) a valve in said outlet conduit regulated by said interface control means thereby permitting the outlet conduit to substantially continuously pass heated discharge fluids from said vessel;
   (f) a T, or similar joint connecting said pressure relief conduit means and said discharge outlet conduit so that a portion of a heated discharge fluid contacts the downstream side of said relief conduit means and prevents freezing of fluid in said relief system and said T joint further provides a means for common discharge of fluids;
   (g) a pressure relief valve contained in said pressure relief conduit means in such a position to permit a heat exchange relation between said valve and said discharge conduit.

2. The apparatus according to claim 1 wherein said interface control means is a liquid interface control means.

3. The apparatus according to claim 1 wherein the relief valve is so positioned in relation to said vessel to permit heat conduction therefrom.

References Cited

UNITED STATES PATENTS

| | | | |
|---|---|---|---|
| 1,984,003 | 12/1934 | Welsh | 210—120 X |
| 2,008,375 | 7/1935 | Wheaton | 210—533 |
| 2,026,196 | 12/1935 | Stephens | 210—533 |
| 2,474,006 | 6/1949 | Maycock | 210—112 X |
| 2,675,126 | 4/1954 | Williams | 210—112 X |
| 2,681,150 | 6/1954 | Reid | 210—112 |
| 3,275,565 | 9/1966 | Sailors | 210—533 X |

REUBEN FRIEDMAN, Primary Examiner.

J. ADEE, Assistant Examiner.

U.S. Cl. X.R.

210—114, 181, 197